UNITED STATES PATENT OFFICE.

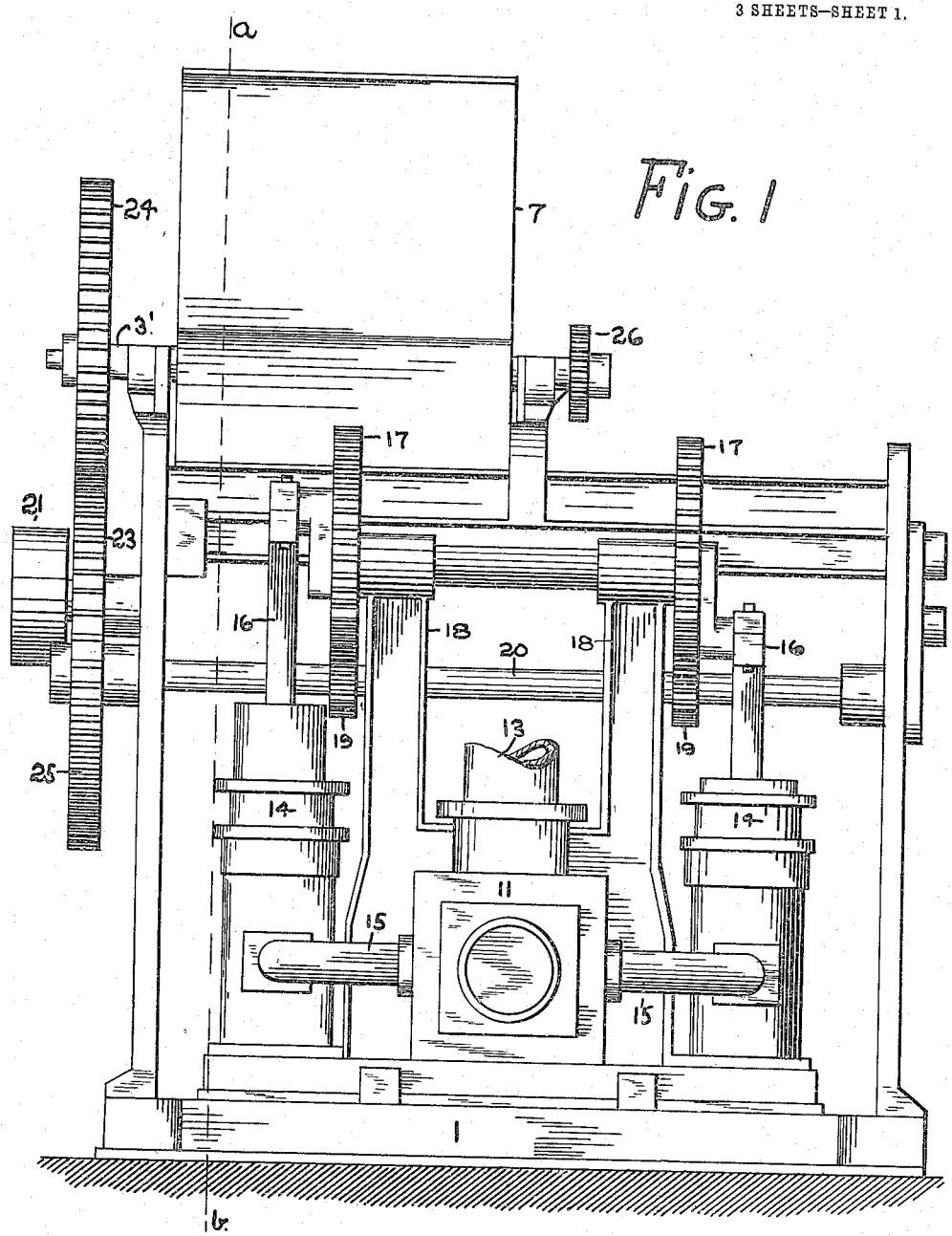

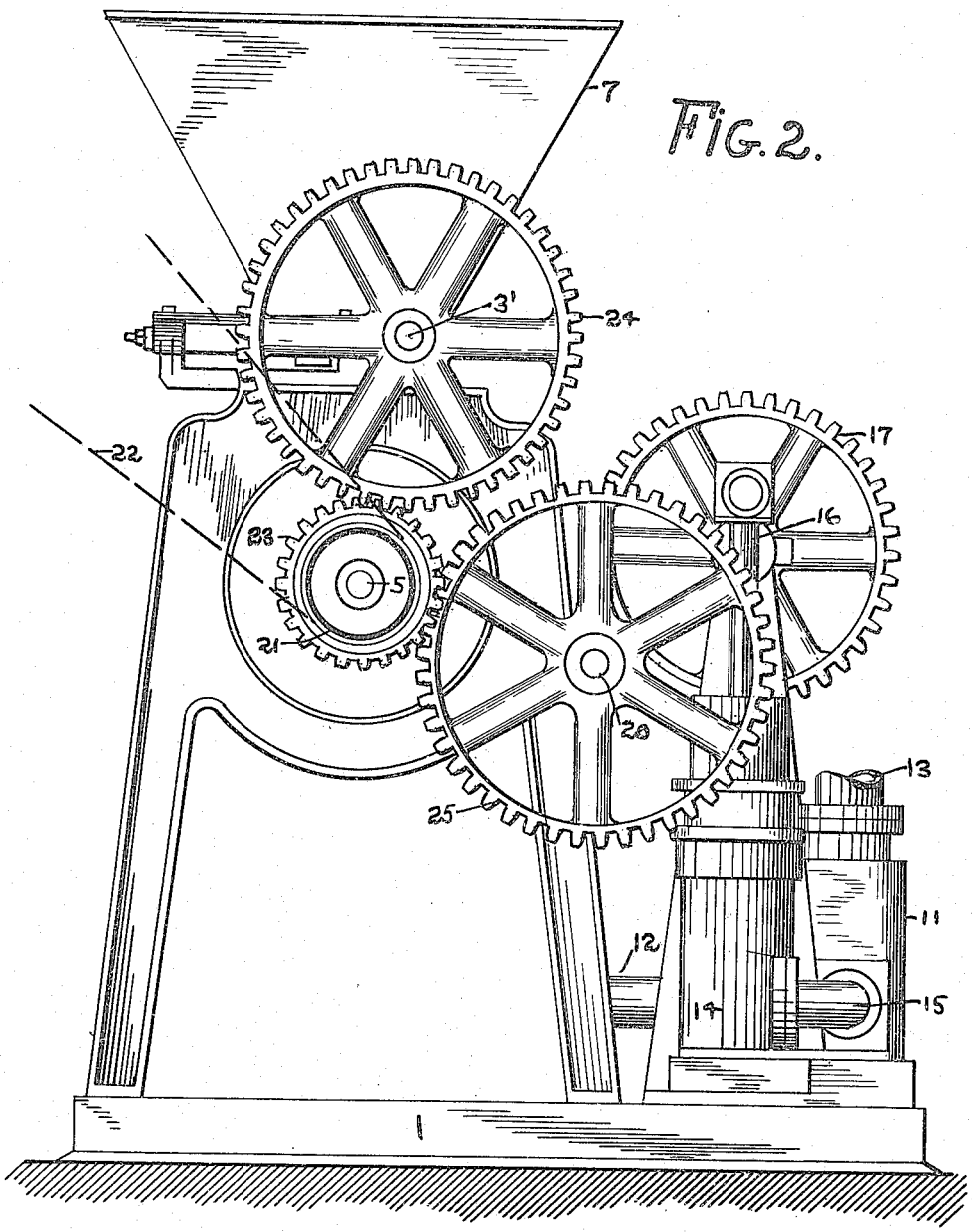

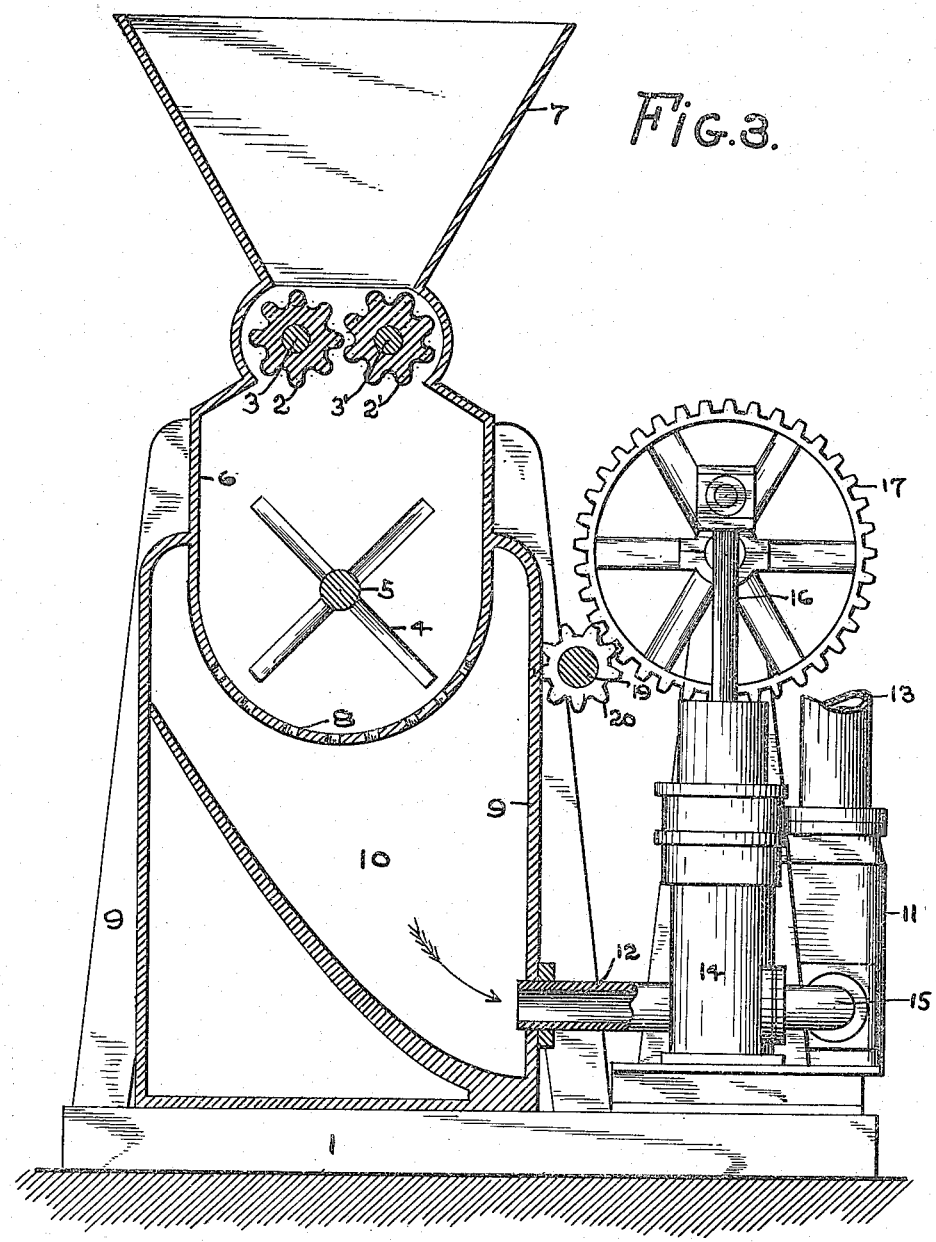

EDGAR T. MEAKIN, OF BERKELEY, CALIFORNIA.

FRUIT-CRUSHING DEVICE.

1,128,026.

Specification of Letters Patent.

Patented Feb. 9, 1915.

Application filed July 6, 1911. Serial No. 637,220.

*To all whom it may concern:*

Be it known that I, EDGAR T. MEAKIN, residing in Berkeley, county of Alameda, State of California, have invented certain new and useful Improvements in Fruit-Crushing Devices, whereof the following is a specification.

My invention relates to combined means for crushing and stemming fruits, especially grapes and to convey the must thereof to a receiving tank for fermenting purposes or otherwise. Heretofore the operation above mentioned was carried on by independently set up apparatus provided respectively with power connecting means thus requiring costly connections, expensive and slow handling of the grapes and the must thereof also a great deal of ground space, for mounting and operating them.

To carry out my invention in practice and to obviate the objections just mentioned thereby accomplishing the object I have in view, I construct a base of suitable size and strength upon which I set a crusher and stemmer inclosed in a casing provided with a hopper at its top and a lower projecting semi-cylindrical perforated bottom, all of which are supported upon the base by suitable frame.

Within the frame just mentioned and inclosing the perforated bottom of the casing I provide a receiving chamber and connect the same to a valve-chest set up upon the base and provided with a conveying or discharge pipe mounted thereon and connected to a receiving tank for fermenting purposes or otherwise. I then connect the valve-chest respectively at the sides thereof to suction and force pump which are also mounted upon the base.

The crusher, stemmer and pump above mentioned are provided with shafts for operating the same and upon these shafts I secure gears of differential diameter meshing together for transmitting the power from the driving shaft to the other shafts according to their required revolution.

By way of making my invention perfectly intelligible and explaining the means for carrying it into effect, I have, in the accompanying three sheets of drawings, illustrated the same, in what I consider the best embodiment, but I wish it to be understood that I do not limit myself to the peculiar construction thus shown, except as specially set forth in the claims at the end thereof.

This invention relates to combined grape crushing, stem removing and must pumping machines for the use in the process of wine making from grapes, and has for its object the production of mechanism that will complete in one continuous operation the several performances required in said process.

Another object is to obviate the defect, now met with in machines of this nature, of the frequent clogging of the suction pipe of the must pump by pomace, and in this way eliminate the necessity of frequent stopping of the machine, the removal of all the liquid contents from the must pan, and the cleaning of the suction pipe of the must pump.

To these ends and objects chiefly my invention embraces a pair of crushing rollers located at the bottom of a feed hopper, means for detaching the grapes from the stems, expelling the latter from the machine, and a novel arrangement for delivering the must from the stemming means to the pump.

The invention embraces further a pump to remove the must from the pan, and deliver it to a higher elevation into the must tanks.

The invention further embraces a novel construction and arrangement of parts and mechanism, producing a continuously operating machine, that will not readily clog, all as hereinafter described and set forth.

The following description explains at length the nature of my said invention, and the manner in which I proceed to apply and carry out the same in the production of an improved machine for the purpose named, reference being had to the drawings that accompany and form part thereof.

Referring to the subjoined drawings forming a part of the following specification in which:—

Figure 1, is a front elevation of my combined devices mounted upon the same base. Fig. 2, is a side elevation of same and Fig. 3, is a sectional elevation taken on line $ab$ of Fig. 1.

Referring now to the several views of the drawings similar numeral figures and letters of reference denote corresponding parts wherever they occur.

Thus 1, represents the base upon which my combination of devices is mounted, consisting of crushing rollers 2 and 2' secured respectively to shafts 3 and 3', stemmer 4 on shaft 5, and casing 6, in which both the crushing rollers and stemmers are held in position, 7 the hopper on the top of the casing and 8 the projecting semi-cylindrical perforated bottom at the lower end thereof all of which are supported in position on the base 1 by vertical frame 9 in which is located the receiving chamber 10 as particularly shown in Fig. 3.

Upon the base 1 and adjacent to the frame 9 is the valve-chest 11, connected with the receiving chamber 10 by means of pipes 12, shown exclusively in Fig. 3 and provided with the discharge pipe 13 secured thereon for the purpose above mentioned. Mounted also upon the base 1 and in a line parallel to the frame 9 is a pair of combined suction and force pumps 14, this number may however be reduced or increased in accordance with the requirements and are connected to the valve-chest by means of pipes 15 secured to the sides thereof as particularly shown in Fig. 1.

The piston connecting rods 16 of the pumps are pivoted to gears 17, shown in Figs. 1 and 3 and which are mounted on frame 18 secured to base 1 and meshing with pinion 19 on power transmitting shaft 20.

Having described so far the general arrangement of the parts composing the various devices which form the subject of this application, I shall now describe the combined means for operating the same which are as follows:

Upon the shaft 5 of the stemmer I secure a pulley 21 and connect the same to the source of power by means of belt 22 shown in dotted line, Fig. 2 and adjacent to said pulley is a pinion 23 secured to the same shaft and meshing with gear 24 on shaft 3' of roller 2' and gear 25 on power transmitting shaft 20 of pinion 19 thus transmitting the power to the roller 2' and pinion 19 which in turn operate the gears 17 and consequently the pumps 14. The opposite end of shaft 3' is provided with gear wheel 26 as shown in Fig. 1 meshing with similar wheel on shaft 3 not shown in the drawings, for transmitting the power to said shaft.

In practice the grapes or other fruits for which my invention may be used are dumped into the hopper 7 and crushed between the rollers 2 and 2' and therefrom drop onto the stemmer 4 located within the projecting semi-cylindrical bottom 8 where the stems are removed through an opening provided for on the side of the casing at the end of the stemmer while the must thereof passes through the perforations of bottom 8 into the receiving chamber 10 below. From the receiving chamber the must is pumped out into the valve-chest 11 through pipes 12 by means of pumps 14 and connecting pipes 15 and then from the valve-chest forced into the fermenting tank or other receptacle, thus the operation of my combined devices may be continuously operated in the same manner with the same result.

Believing I have produced a useful and novel improvement and described same to be fully understood by mechanics skilled in the art to which my invention appertains, what I claim and desire to secure by Letters Patent of the United States is:—

1. An apparatus of the character described, comprising in combination, a hopper, a casing below said hopper and having a perforate bottom, a plurality of crushing rollers disposed in the neck of said hopper, a stemmer disposed in said casing, a must pump for the removal and delivery of both solids and liquids of the pomace, and a receiving chamber disposed below said hopper and casing and having an inclined floor sloping toward the suction inlet of said pump, a driven gear wheel train adapted to simultaneously operate said crushing rollers, pump and stemmer, and a base adapted to receive all of said members whereby a unitary structure is obtained.

2. An apparatus of the character described, comprising in combination, a hopper, a casing below said hopper and having a perforate bottom, a plurality of rotary crushing rollers disposed in the neck of said hopper, a rotary stemmer disposed in said casing adjacent the said perforate bottom, a must pump for the removal and delivery of both solids and liquids of the pomace, and a receiving chamber disposed below said hopper and casing and adapted to receive the discharge therefrom, said casing being provided with an inclined floor sloping toward the suction inlet of said pump, a driven gear wheel train adapted to simultaneously operate said crushing rollers, stemmer, and pump, and a base adapted to receive all of said members whereby a unitary structure is obtained.

3. In a machine of the character described, the combination of means to receive and crush bunches of grapes, means for the separation and expulsion of the stems, a must pump for the removal and delivery of both solids and liquids of the pomace, and means for delivering the liquids and solids of the pomace to the pump in an unseparated condition, said last mentioned means comprising a must chamber having a floor sloping sharply to its lowest point and a suction pipe for the pump opening out of said chamber near the lowest point thereof.

In testimony that I claim the foregoing I have hereunto set my hand in the presence of witnesses, this 10 day of June 1911.

EDGAR T. MEAKIN.

Witnesses:
C. J. DAHL,
TECK L. SORY.

Copies of this patent may be obtained for five cents each, by addressing the "Commissioner of Patents, Washington, D. C."